United States Patent [19]

Howard et al.

[11] Patent Number: 5,184,465
[45] Date of Patent: Feb. 9, 1993

[54] LANDING GEAR DRAG STRUT ACTUATOR HAVING SELF-CONTAINED PRESSURE CHARGE FOR EMERGENCY USE

[75] Inventors: Douglas A. Howard, Media; Keith C. Walker, Broomall, both of Pa.

[73] Assignee: The Boeing Company, Seattle, Wash.

[21] Appl. No.: 589,660

[22] Filed: Sep. 28, 1990

[51] Int. Cl.[5] .............................................. F16D 31/02
[52] U.S. Cl. ........................................ 60/403; 60/413; 91/5; 91/44; 92/24; 244/102 SL; 244/102 R
[58] Field of Search ................. 60/403, 404, 406, 413, 60/405; 91/5, 43, 44; 92/24; 244/102 SL, 102 R

[56] References Cited

U.S. PATENT DOCUMENTS 2,803,222  8/1957  Bukoff ................... 91/44
3,008,454  11/1961  Wilkins ................... 91/44
4,608,913  9/1986  Bonafous ................... 91/5

FOREIGN PATENT DOCUMENTS 565213  11/1944  United Kingdom ............ 244/102 R

Primary Examiner—Edward K. Look
Assistant Examiner—F. Daniel Lopez
Attorney, Agent, or Firm—Jones, Tullar & Cooper

[57] ABSTRACT

An actuator for raising and lowering aircraft landing gear in accordance with the extended and retracted state of the actuator includes a cylindrical casing, a piston assembly slidable along the axis of the casing, a fluid pressure source, a sealed chamber containing gas, a free piston forced by fluid pressure along the casing axis to compress the gas, latching devices for locking the piston assembly to the casing, a locking mechanism for holding the free piston in position on the pressure tube when the gas is compressed and hydraulic passages interconnecting the chamber containing pressurized gas and the space containing pressurized hydraulic fluid. A mechanism is provided for initiating automatic retraction of the actuator due to the effect of a self-contained perpetual source of compressed gas if hydraulic pressure is lost. A compression spring stores a force while the piston assembly moves between retracted and extended positions. The spring force operates to automatically latch the piston assembly to the casing. Axial movement of the piston assembly disconnects the latch attachment.

22 Claims, 3 Drawing Sheets

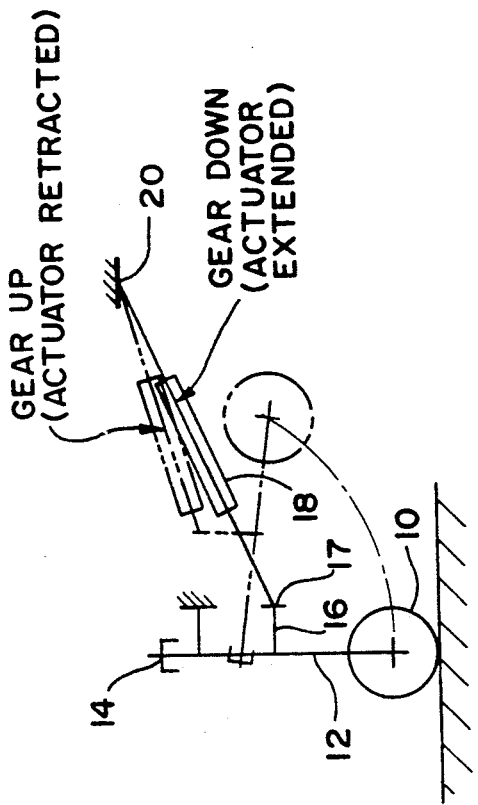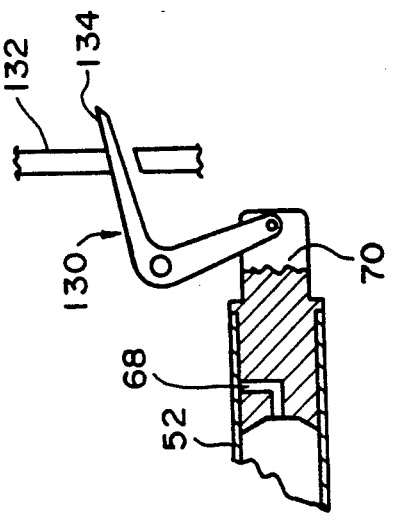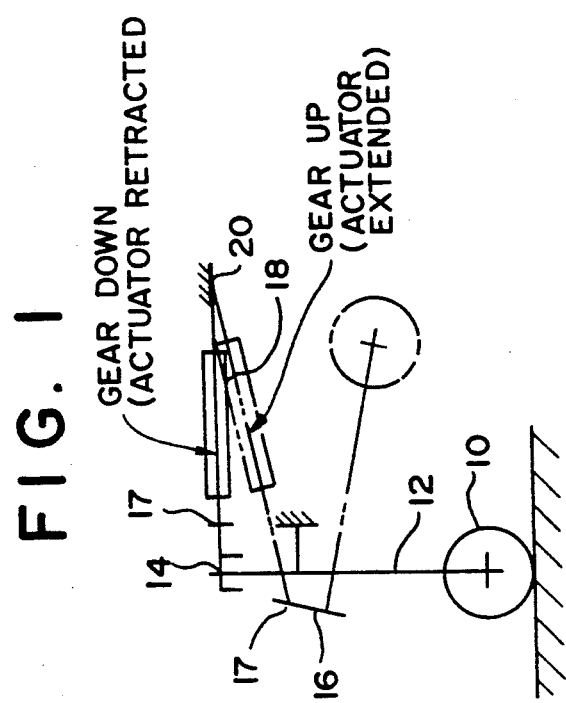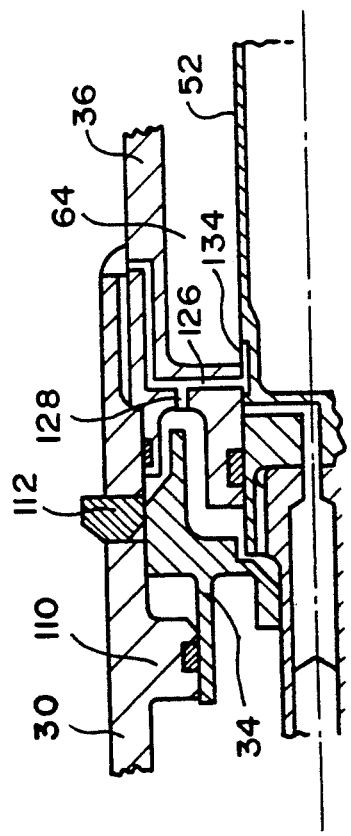

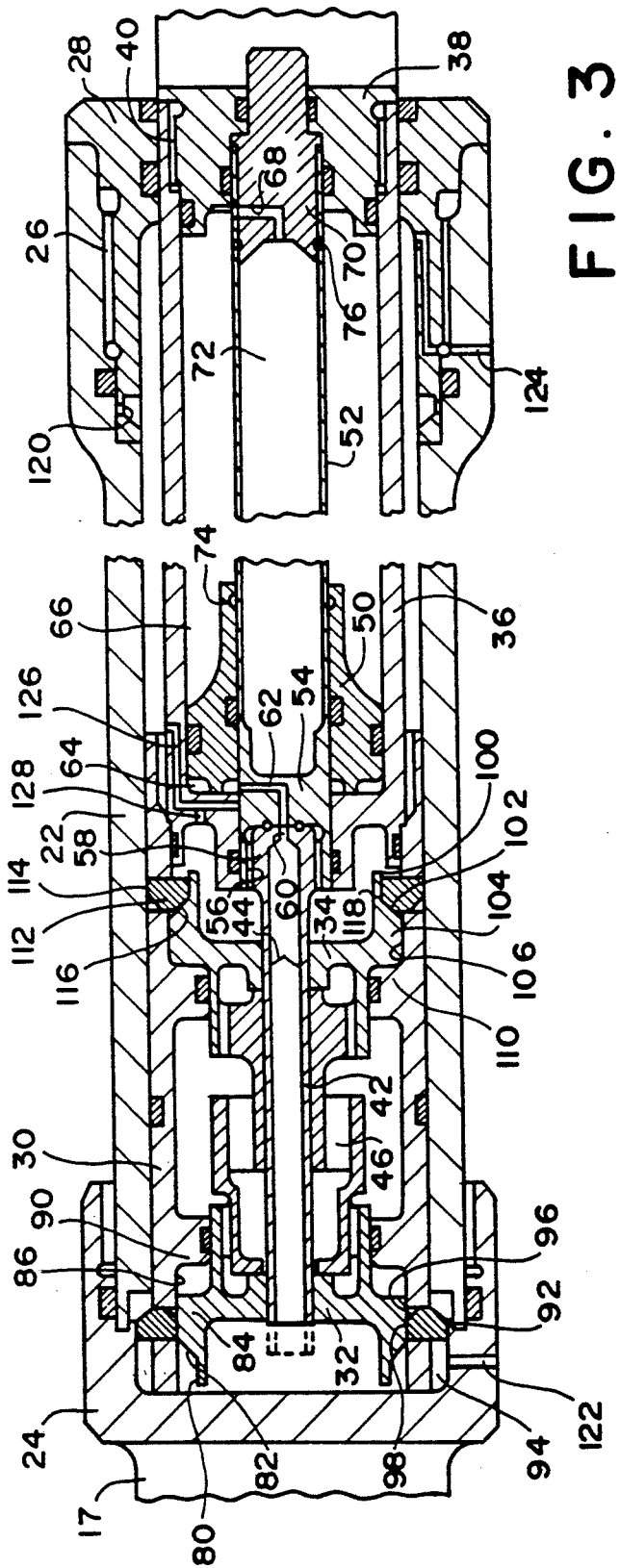
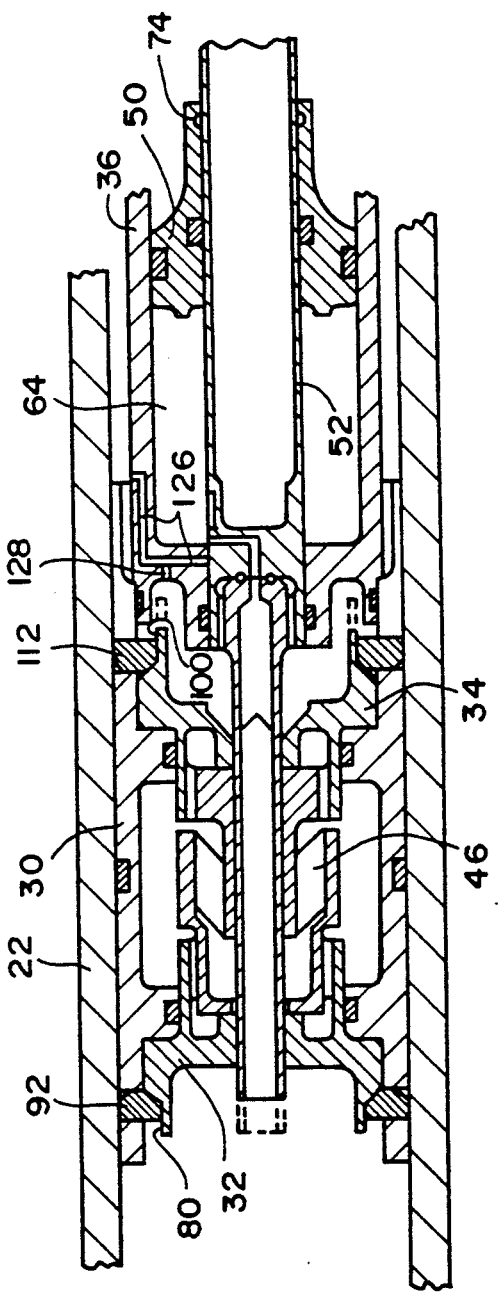
FIG. 3
FIG. 4

LANDING GEAR DRAG STRUT ACTUATOR HAVING SELF-CONTAINED PRESSURE CHARGE FOR EMERGENCY USE

BACKGROUND OF THE INVENTION

1. Field of the Invention

This invention relates to the field of hydraulic systems, and deals more particularly with such systems for raising and lowering aircraft landing gear without access to an external power source.

2. Description of the Prior Art

Aircraft landing gear is raised and lowered through operation of hydraulic actuators pressurized by a fluid pump driven from the aircraft engines. Failure of the engines in flight or loss of the fluid pressure source for any other reason during flight requires a secondary source of power to open the landing gear doors, lower the gear and lock the gear in position against collapse when bearing weight of the aircraft, on impact during landing.

Conventionally hydraulic actuators, capable of extension in length and retraction in response to pressure produced by the fluid pressure source, are used to raise and lower the landing gear.

Various techniques have been developed to deal with an in-flight loss of power and to lower the gear in this condition. U.S. Pat. No. 4,108,402 describes an auxiliary system involving a parachute canopy energized by the pilot for supporting an aircraft in the event of power failure.

U.S. Pat. No. 3,107,866 describes a hydraulic system for coordinating sequential operation of a wheel well door and a landing gear. U.S. Pat. No. 3,224,713 describes an electronic system intended to prevent gear-up landing incidents resulting from premature retraction of the gear after takeoff and where the gear is inadvertently raised while the aircraft is on the ground.

Shock absorber for dissipating energy from impact loads on landing are described in U.S. Pat. Nos. 4,508,201; 4,506,869; 4,437,548; 4,405,119; and 4,372,545. None of these pertains to an actuator for storing a pressurized charge for use in lowering the gear in the event of in-flight loss of power.

SUMMARY OF THE INVENTION

It is an object of this invention to provide a drag strut/actuator able to produce automatically a self-contained pressurized charge of expandable fluid for use in retracting the actuator, lowering aircraft landing gear, and locking the landing gear in position without requiring access to external power or a source of pressurized fluid. The emergency power source is isolated from the normally available power source and can be monitored periodically for magnitude of the pressure it contains. The emergency power source is perpetually available and preserved for release in the event of loss of the conventional power source, yet it need not be pressurized during each extension of the actuator. This characteristic saves power while the actuator is stroked between fully extended and retracted positions during normal use.

The landing gear drag strut/actuator according to this invention raises and lowers aircraft landing gear in accordance with the extended and retracted state of the actuator. The actuator system of this invention eliminates the need for an external emergency power system and the need for the associated mounting provisions and controls. Weight is saved and the number of parts is reduced in comparision to the weight and number of parts required for conventional systems able to provide the function of this actuator.

Maintenance and reliability of this actuator is improved over current actuator systems because of the reduced number of parts and location of the emergency power within the actuator itself. The actuator has capacity to store a sufficient charge of pressurized gas equal to twice the maximum load required to lower and lock the landing gear. The actuator of this invention will operate appropriately with a drag strut/actuator retracted-gear down system as described and illustrated below and with an actuator extended-gear down system.

In realizing these advantages the actuator includes a cylindrical casing, a piston assembly slidable along the axis of the casing, a fluid pressure source, a sealed chamber containing gas, a free piston forced by fluid pressure along the casing axis to compress the gas, latching devices for locking the piston assembly to the casing, a locking mechanism for holding the free piston in position on the pressure tube when the gas is compressed and hydraulic passages interconnecting the chamber containing pressured gas and the space containing pressurized hydraulic fluid. A mechanism is provided for initiating automatic retraction of the actuator due to the effect of a self-contained perpetual source of compressed gas if hydraulic pressure is lost. A compression spring stores a force while the piston assembly moves between retracted and extended positions. The spring force operates to automatically latch the piston assembly to the casing. Axial movement of the piston assembly disconnects the latch attachment.

BRIEF DESCRIPTION OF THE DRAWING

The invention is described in more detail with reference to the embodiments illustrated in the following drawings.

FIG. 1 is a schematic diagram of a landing gear lowered by retraction of a drag strut actuator according to this invention.

FIG. 2 is a schematic diagram of a landing gear lowered by extension of a drag strut actuator according to this invention.

FIG. 3 is a cross section through the longitudinal axis of a drag strut actuator showing the components in position with the actuator fully retracted.

FIG. 4 is a cross section similar to that of FIG. 3 showing the components at mid-stroke with the actuator moving toward the extended position.

FIG. 6 shows in cross section a local detail near adjacent ends of a gas tube and spool when the actuator retraction stroke begins.

FIG. 7 is a schematic diagram showing a mechanism accessible within an aircraft for manually starting actuator retraction.

DESCRIPTION OF THE PREFERRED EMBODIMENT

Figure 5:
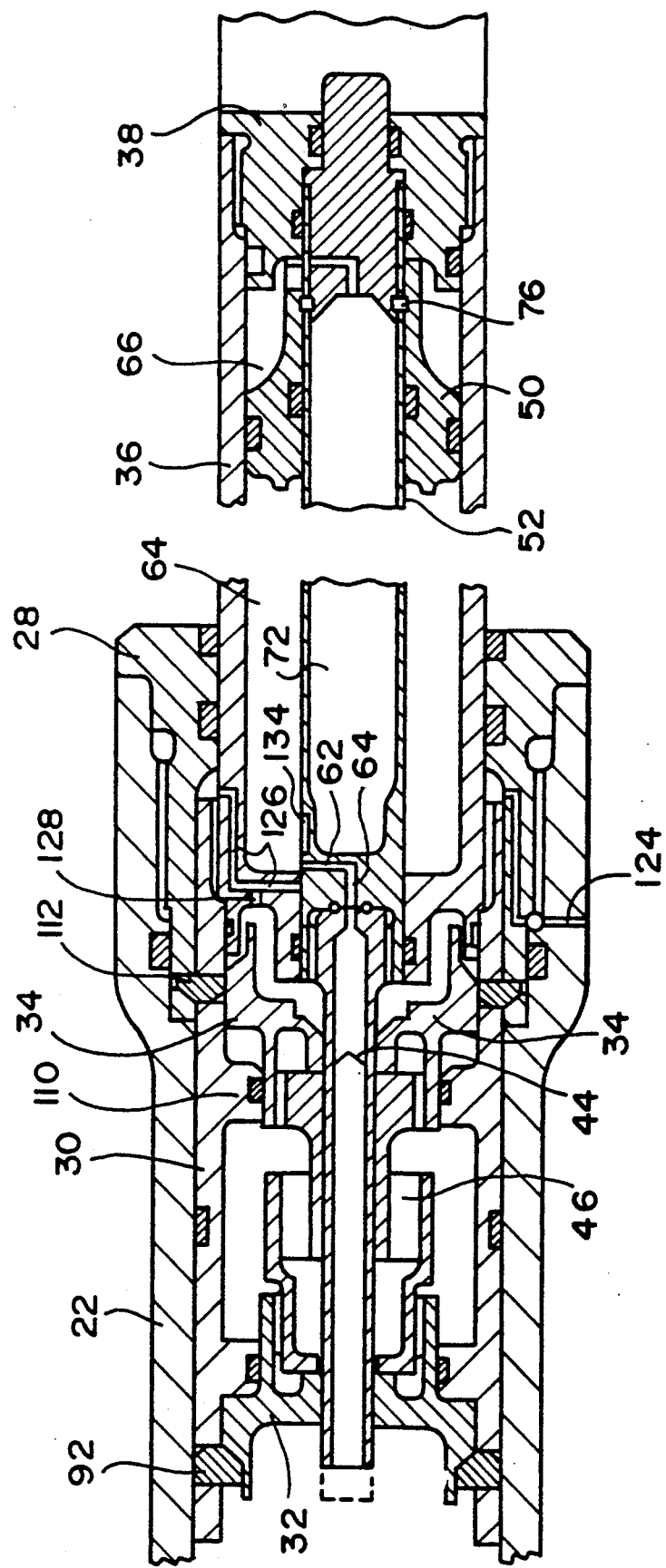
FIG. 5 is a cross section similar that of FIGS. 3 and 4 showing the components in position with the actuator fully extended.

Referring first to FIG. 1, an aircraft landing gear includes a wheel 10 carried at the end of a strut 12 supported at a pivotable connection 14. A crank arm 16, connected to the strut and extending outward therefrom, is connected pivotably at 17 to an actuator 18, which is attached to a fixed point 20 on the airframe pivotably and non-displaceably. The actuator is connected to a source of fluid pressure, which causes the length of the actuator to extend and retract thereby raising and lowering the landing gear. When the actuator is retracted, the landing gear is lowered; when the actuator is extended, as shown by the phantom lines, the landing gear is raised. In FIG. 2 the components are arranged such that the landing gear is raised when the actuator is retracted and lowered when the actuator is extended.

The actuator 18 according to the present invention, shown in FIG. 3 in the retracted position, includes a circular cylindrical casing 22 closed at its left-hand end by a cap 24 and closed by a gland nut 28 by engagement with a screw thread 26. Located within the casing and mounted for sliding displacement along the axis of the casing are a piston 30, first and second lock pistons 32, 34, a piston rod 36 and a nut 38, connected to the piston rod by engagement with screw thread 40.

A conduit 42, coaxial with the casing, defines a bore, within which is located a check valve 44 that prevents flow of hydraulic fluid leftward along the bore but permits fluid flow in the right-hand direction in the bore. The conduit determines the radial position of lock pistons 32, 34 and secures their correct radial position relative to piston 30. A compression spring 46 mutually connects the lock pistons and biases them toward a position of spring force equilibrium where the axial distance between the lock pistons is as shown in FIGS. 3 and 5. If the axial distance between the lock pistons is reduced from that shown in FIGS. 3 and 5, the spring compresses and resiliently urges the lock pistons apart. The spring produces a breakout load to resist hydraulic system back pressure and provides stroke capability to latch and unlatch the lock elements.

Piston rod 36 is mechanically attached to piston 30 by engagement of internal screw threads on the piston with external threads on the piston rod. Similarly conduit 42 is mechanically attached to pressure tube 52 by engagement of internal screw threads on the tube with external threads on the conduit.

The bore of conduit 42 terminates in a passage 60 that carries hydraulic fluid pressure to a free or floating piston 50. A pressure tube 52, coaxial with the casing, has a cylindrical outer surface on which the free piston is mounted for sliding movement along the tube. The left hand of tube 52 defines a head 54 having a recess 56 adapted to receive the head 58 of the conduit therein. Heads 54, 58 contain passages 60, 62, which are aligned to communicate the bore of conduit 42 to a first chamber 64 within piston rod 36 located on the left-hand side of the free piston 50. A second chamber 66, within piston rod 36 and located on the opposite side of the free piston from the chamber 64, is filled with gas, such as nitrogen, and communicates through passage 68, formed in a plug 70 at the right-hand end of tube 52, with the cavity 72 of the pressure tube 52.

The free piston 50 contains several recesses within which O-rings are located to seal space 66, which preferably contains gas, from chamber 68, which preferably contains hydraulic fluid such as oil. The free piston so also contains a recess 74 opening radially inward toward the outer surface of the tube 52. Recess 74 is able to receive a locking member 76, such as a snap ring, carried on the outer surface of tube 52 and biased resiliently toward engagement with recess 74. When the recess and locking member are aligned axially they are connected mechanically. The locking member and free piston are disengageable by manual application of sufficient net leftward force on the free piston, usually applied by a member of the flight crew on recognizing loss of the fluid pressure source. The free Piston is automatically locked in position by lock member 76 when the free piston bottoms on closure nut 38 and is released when the pressure tube 52 is actuated mechanically or manually.

Lock piston 32 has a cylindrical surface 80, a conical surface 82 and a shoulder 84 sized and located to seat within a recess 86 on the end of piston 30 and to abut shoulder 90 on the piston 30. A latch 92, supported on shoulder 84 and located between a stop surface 94 of cap 24 and the end of piston 30, has an inclined surface 96 and a cylindrical surface 98 complementary to, and able to rest on surfaces 80, 84. Contact between latch 92 and the end of piston 30 limits the extent to which piston 30 can move leftward in the casing. Latch 92 comprises multiple arcuate members extending circumferentially along only a portion of the periphery of lock piston 32 so that they can enter and exit the recess provided to receive them in the casing and cap.

Similarly, lock piston 34 has a cylindrical surface 100, a conical surface 102 and a shoulder 104 sized and located to seat within a recess 106 on the right-hand end of piston 30 and to abut shoulder 110 on the piston. A latch 112, located between a stop surface 114 on the piston rod and the end of piston 30, has an inclined surface 116 and a cylindrical surface 118 complementary to, and able to rest on surfaces 100, 102. Latch 112 is adapted to move radially outward on conical surface 102 into a recess 120 on the inner surface of the casing, as shown in FIG. 5. When latch 112 is located in recess 120, contact between latch 112 and the end of piston 30 limits the extent to which piston 30 can move rightward in the casing. Latch 112 comprises multiple arcuate members extending circumferentially along only a portion of the periphery of lock piston 34 so that they can enter and exit recess 120 provided to receive it in gland nut 28.

Movement of the actuator from the retracted position to the extended position is shown sequentially in FIGS. 3, 4 and 5. Pressurized hydraulic fluid from a pressure source connected to passage 122 develops a pressure force on the extension face at the left-hand end of lock piston 32, which force causes the piston to move rightward into contact with shoulder 90 on piston 30. This action compresses spring 46 and forces latch 92 to move radially inward out of its recess in the casing and into contact with surface 80, thereby disconnecting the piston assembly from the casing and cap.

Pressure, transmitted by conduit 42 past check valve 44 through passages 60, 62 to chamber 64, causes free piston 50 to move rightward within piston rod 36, thereby compressing the pressurized gas contained in chamber 66 and in cavity 72 of pressure tube 52. While the actuator is extending and when it is fully extended, check valve 44 prevents fluid flow from chamber 64 through the bore of conduit 42, but permits flow from the pressure source through the conduit and passages 60, 62 to chamber 64.

The actuator continues to extend in this way due to the effect of the pressurized fluid behind lock piston 32. As FIG. 4 shows, the axial spacing between the lock pistons 32, 34 decreases as the lock pistons move axially in contact with shoulders 90, 110 of piston 30. This compresses the spring and produces a spring force applied to the inner ends of the lock Pistons. In FIG. 4, the free piston is seen to have traveled further along the axis of the pressure tube, thereby increasing the magnitude of gas pressure in the tube and chamber 66. As this occurs, chamber 64 continues to be filled with pressurized hydraulic fluid through passages 60, 62.

Compression of the gas by the free piston continues until the free piston lock 76 seats in recess 74. Pressure in the pressure tube and chamber 64 is then about 4000 pounds per square inch and is available to retract the actuator if the source of pressurized hydraulic fluid should fail.

Actuator extension continues until latch 112 is forced radially outward in a seated position in recess 120. When the latch moves under recess 120, the spring force urging lock piston 34 rightward, forces the latch up the conical surface 116 and to a position of rest on the outer surface 106 of lock piston 34. This action limits further travel of the piston assembly until latch 112 is forced out of recess 120.

The actuator can be retracted under normal conditions with the assistance of fluid pressure admitted to the casing through passage 124. This pressure is carried by passages 126, 128 to the sealed space at the right-hand end of lock piston 34 and develops a force on piston 30 and on the retraction face at the right-hand end of the lock piston tending to move them leftward. As conical surface 102 on the lock piston becomes axially aligned with latch 112, the latch moves radially inward into contact with surface 118 of the lock piston, shoulder 34 contacts shoulder 110 on piston 30, and the unit moves leftward toward the fully retracted position of FIG. 3. As this occurs spring 46 compresses and applies a force to lock piston 32 tending to move it away from lock piston 34. The spring force operates to force latch 92 radially outward into its recess in the casing when the latch and recess become axially aligned.

To retract the actuator using the emergency pressure source, the hydraulic system is assumed failed with only nominal back pressure in its passages.

Various means can be used to mechanically or manually move the pressure tube 52 from the extended position of FIG. 5 rightward in the event of a hydraulic system failure in flight. For example, FIG. 7 shows the plug 70 that closes the end of the pressure tube connected by a pivotably supported lever 130 extending from the retracted landing gear through the cockpit wall 132 into the aircraft. The lever has one arm connected to the plug and another lever arm 134 located for manual operation. Downward movement of arm 134 causes leftward axial displacement of the pressure tube to the position shown in FIG. 6.

This movement of the pressure tube forces piston lock 76 to disengage recess 74 on the free piston, thereby allowing the pressurized gas to expand, forcing piston 52 leftward as the gas expands in chamber 66, and forcing hydraulic fluid in chamber 64 to leave that space. Movement of the pressure tube by action of the flight crew on sensing loss of hydraulic fluid pressure also brings port 134 into communication with passages 126, 128, as shown in FIG. 6. In that position fluid from chamber 64 is admitted through passages 126, 128 to the end of lock piston 34. Thereafter, actuator retraction progresses as described above for the condition with the hydraulic pressure source available. Fluid pressure moves lock piston 34 axially against shoulder 110 of piston 30, latch 112 drops out of its recess and onto a support surface on lock piston 34, and the assembly moves leftward compressing spring 46 until latch 92 becomes seated in the recess due to the spring force.

We claim:

1. An actuator normally extended and retracted in length by pressure actuation from a fluid pressure source, retractable automatically despite loss of the fluid pressure source, comprising:
   a casing having a longitudinal axis;
   a source of pressurized hydraulic fluid;
   a free piston moveable along the casing axis within a sealed pressurizeable space, separating said space into a first chamber potentially containing a second source of pressure and a second chamber;
   first passage means for connecting the fluid pressure source and the second chamber;
   a piston assembly located within the casing, slidable along the axis of the casing between fully extended and fully retracted positions, having an extension face connectable to the fluid pressure source, and a retraction face axially opposite the extension face connectable to the fluid pressure source and the second pressure source;
   second passage means for connecting the second chamber to the retracting face of the piston assembly;
   means for manually opening the second passage means, closing the first passage means, and releasing the second pressure source to expand;
   means responsive to expansion of the second pressure source for moving the free piston to exhaust the second chamber.

2. The actuator of claim 1 further comprising:
   means for releasably holding the free piston against axial displacement at an end of the range of movement of the free piston where the first chamber is pressurized; and
   means for releasing the free piston from the holding means, thereby forcing the free piston to expand the first chamber and to exhaust the second chamber.

3. The actuator of claim 1 further comprising:
   first latching means for releasably connecting the piston assembly to the casing against axial displacement at a first extremity of the range of displacement of the piston;
   second latching means for releasably connecting the piston assembly to the casing against axial displacement at a second extremity of the range of displacement of the piston distant from said first extremity, and wherein the piston assembly includes:
   a first locking piston having the extension face thereon;
   a second lock piston, spaced axially from the first lock piston, having the retraction face thereon; and
   spring means resiliently biasing the first and second lock pistons axially apart.

4. The actuator of claim 3 wherein the first lock piston has a shoulder and the second lock piston has a shoulder, further comprising:
   a return piston carrying first and second axially spaced latches engageable with the casing and retractably releasable therefrom, having a first shoulder adapted for contact with the shoulder of the first lock piston while the fluid pressure source is connected to the extension face of the piston assembly, and a second shoulder adapted for contact with the shoulder of the second lock piston while the fluid pressure source is connected to the retraction face of the piston assembly.

5. The actuator of claim 1 further comprising:
a hollow piston rod connected to the piston assembly for axial movement therewith;
a pressure tube having an outer surface along which the free piston slides in response to application of pressure from the fluid pressure source and the second pressure source, the outer surface of the tube and the inner surface of the piston rod defining the first and second chambers therebetween, the pressure tube having a inner cavity connected to the first chamber.

6. The actuator of claim 1, wherein the first passage means comprises:
a hollow conduit having an outer surface on which the piston assembly and spring means are slidably supported, the conduit having a central bore communicating with the fluid pressure source;
check valve means for permitting fluid flow from the fluid pressure source to the second chamber and preventing fluid flow from the second chamber through the central bore of the conduit.

7. The actuator of claim 1, further comprising:
a hollow piston rod connected to the piston assembly for axial movement therewith;
a pressure tube having an outer surface along which the free piston slides in response to application of pressure from the fluid pressure source and the second pressure source, the outer surface of the tube and the inner surface of the piston rod defining the first and second chambers therebetween, the pressure tube having a inner cavity connected to the first chamber;
a hollow conduit connected to the pressure tube for axial displacement therewith, having an outer surface on which the piston assembly and spring means are slidably supported, the conduit having a central bore communicating with the fluid pressure source;
check valve means for permitting fluid flow from the fluid pressure source to the second chamber and preventing fluid flow from the second chamber through the central bore of the conduit.

8. The actuator of claim 1 wherein the second passage means comprises:
a first passage communicating with the retraction face of the piston assembly; and
a port displaceable by the opening and closing means to a position where the second chamber communicates with the retraction face of the piston assembly through the first passage, and displaceable by the opening and closing means to a position where communication between the second chamber and the retraction face of the piston assembly is closed.

9. The actuator of claim 1, wherein the opening and closing means comprises:
a hollow piston rod in which a first passage communicating with the retraction face of the piston assembly is formed;
a conduit having a second passage communicating with the fluid pressure source;
a pressure tube connected to the conduit for displacement therewith, displaceable between first and second positions, having a port thereon adapted to connected the second chamber and the first passage and to close the second passage and the second chamber when the pressure tube and conduit are in the first position, and to disconnect the second chamber and the first passage and to connect the second passage and the second chamber when the pressure tube and conduit are in the second position.

10. The actuator of claim 1 further comprising third passage means communicating the fluid pressure source and the retraction face of the piston assembly.

11. An extendable and retractable actuator automatically retractable by operation of a self-contained pressure source, comprising:
a first pressure source;
a second pressure source forming said self-contained pressure source;
means responsive to communication with the first pressure source for extending a portion of the actuator and releasably holding high pressure in said second pressure source, wherein the extended portion of the actuator contains said second pressure source and at least part of said first pressure source;
means for manually releasing the second pressure source; and
means responsive to release of the second pressure source for retracting the actuator.

12. The actuator of claim 11 further comprising:
first latching means for releasably connecting the actuator extending means against axial displacement at a first extremity of its range of displacement;
second latching means for releaseably connecting the actuator retracting means against axial displacement at a second extremity of its range of displacement distant from said first extremity.

13. The actuator of claim 11 further comprising:
check valve means for communicating the first pressure source to the retracting means and Preventing communication between the retracting means and the first pressure source.

14. An extendable and retractable actuator for raising and lowering aircraft landing gear in accordance with an extended and retracted state of the actuator, comprising:
a casing having a longitudinal axis;
a source of pressurized hydraulic fluid;
a free piston moveable along the casing axis within a sealed pressurizeable space, separating said space into a first chamber potentially containing a second source of pressure and a second chamber;
first passage means for connecting the fluid pressure source and the second chamber;
a piston assembly located within the casing, slidable along the axis of the casing between fully extended and fully retracted positions, having an extension face connectable to the fluid pressure source and a retraction face axially opposite the extension face connectable to the fluid pressure source and the second pressure source;
second passage means for connecting the second chamber to the retracting face of the piston assembly;
means for manually opening the second passage means, closing the first passage means, and releasing the second pressure source to expand;
means responsive to expansion of the second pressure source for moving the free piston to exhaust the second chamber; and third passage means communicating the fluid pressure source and the retraction face of the piston assembly.

15. The actuator of claim 14 further comprising:
means for releasably holding the free piston against axial displacement at an end of the range of movement of the free piston where the first chamber is pressurized; and
means for releasing the free piston from the holding means, thereby forcing the free piston to expand the second chamber and to exhaust the second chamber.

16. The actuator of claim 14 further comprising:
first latching means for releasably connecting the piston assembly to the casing against axial displacement at a first extremity of the range of displacement of the piston;
second latching means for releasably connecting the piston assembly to the casing against axial displacement at a second extremity of the range of displacement of the piston distant from said first extremity, and wherein the piston assembly includes:
a first locking piston having the extension face thereon;
a second lock piston, spaced axially from the first lock piston, having the retraction face thereon; and
spring means resiliently biasing the first and second lock pistons axially apart.

17. The actuator of claim 16 wherein the first lock piston has a shoulder and the second lock piston has a shoulder, further comprising:
a return piston carrying first and second axially spaced latches engageable with the casing and retractably releasable therefrom, having a first shoulder adapted for contact with the shoulder of the first lock piston while the fluid pressure source is connected to the extension face of the piston assembly, and a second shoulder adapted for contact with the shoulder of the second lock piston while the fluid pressure source is connected to the retraction face of the piston assembly.

18. The actuator of claim 14 further comprising:
a hollow piston rod connected to the piston assembly for axial movement therewith;
a pressure tube having an outer surface along which the free piston slides in response to application of pressure from the fluid pressure source and the second pressure source, the outer surface of the tube and the inner surface of the piston rod defining the first and second chambers therebetween, the pressure tube having a inner cavity connected to the first chamber.

19. The actuator of claim 14, wherein the first passage means comprises:
a hollow conduit having an outer surface on which the piston assembly and spring means are slidably supported, the conduit having a central bore communicating with the fluid pressure source;
check valve means for permitting fluid flow from the fluid pressure source to the second chamber and preventing fluid flow from the second chamber through the central bore of the conduit.

20. The actuator of claim 14, further comprising:
a hollow piston rod connected to the piston assembly for axial movement therewith;
a pressure tube having an outer surface along which the free piston slides in response to application of pressure from the fluid pressure source and the second pressure source, the outer surface of the tube and the inner surface of the piston rod defining the first and second chambers therebetween, the pressure tube having a inner cavity connected to the first chamber;
a hollow conduit connected to the pressure tube for axial displacement therewith, having an outer surface on which the piston assembly and spring means are slidably supported, the conduit having a central bore communicating with the fluid pressure source;
check valve means for permitting fluid flow from the fluid pressure source to the second chamber and preventing fluid flow from the second chamber through the central bore of the conduit.

21. The actuator of claim 14 wherein the second passage means comprises:
a first passage communicating with the retraction face of the piston assembly; and
a port displaceable by the opening and closing means to a position where the second chamber communicates with the retraction face of the piston assembly through the first passage, and displaceable by the opening and closing means to a position where communication between the second chamber and the retraction face of the piston assembly is closed.

22. The actuator of claim 14, wherein the opening and closing means comprises:
a hollow piston rod in which a first passage communicating with the retraction face of the piston assembly is formed;
a conduit having a second passage communicating with the fluid pressure source;
a pressure tube connected to the conduit for displacement therewith, displaceable between first and second positions, having a port thereon adapted to connect the second chamber and the first passage and to close the second passage and the second chamber when the pressure tube and conduit are in the first position, and to disconnect the second chamber and the first passage and to connect the second passage and the second chamber when the pressure tube and conduit are in the second position.

* * * * *